US011923605B2

(12) United States Patent
Cerretelli et al.

(10) Patent No.: US 11,923,605 B2
(45) Date of Patent: Mar. 5, 2024

(54) MILLIMETER-WAVE ANTENNA FOR 5G APPLICATIONS AND VEHICLE COMPRISING SUCH ANTENNA

(71) Applicant: ASK Industries S.p.A., Monte San Vito (IT)

(72) Inventors: Matteo Cerretelli, Sesto Fiorentino (IT); Agnese Mazzinghi, Florence (IT); Angelo Freni, Florence (IT); Fabio Casoli, Reggio Emilia (IT); Andrea Notari, Scandiano (IT); Stefano Lenzini, Modena (IT); Luca Vincetti, Parma (IT)

(73) Assignee: ASK INDUSTRIES S.P.A., Monte San Vito (IT)

( * ) Notice: Subject to any disclaimer, the term of this patent is extended or adjusted under 35 U.S.C. 154(b) by 45 days.

(21) Appl. No.: 17/675,203

(22) Filed: Feb. 18, 2022

(65) Prior Publication Data

US 2022/0271420 A1 Aug. 25, 2022

(30) Foreign Application Priority Data

Feb. 19, 2021 (IT) ........................ 102021000003860

(51) Int. Cl.
*H01Q 1/32* (2006.01)
*H01Q 1/52* (2006.01)
(Continued)

(52) U.S. Cl.
CPC ............... *H01Q 1/32* (2013.01); *H01Q 1/521* (2013.01); *H01Q 13/10* (2013.01); *H01Q 21/0087* (2013.01); *H01Q 1/241* (2013.01)

(58) Field of Classification Search
CPC .......... H01Q 1/32; H01Q 1/521; H01Q 13/10; H01Q 21/0087; H01Q 9/0414; H01Q 9/0457
See application file for complete search history.

(56) References Cited

U.S. PATENT DOCUMENTS 4,903,033 A * 2/1990 Tsao ..................... H01Q 15/244 343/700 MS
5,043,738 A * 8/1991 Shapiro ................ H01Q 9/0435 343/700 MS
(Continued)

FOREIGN PATENT DOCUMENTS

| | | | |
|---|---|---|---|
| KR | 102168766 B1 | * | 10/2020 |
| WO | WO 2015/065509 | | 7/2015 |
| WO | WO 2016/053501 | | 4/2016 |

OTHER PUBLICATIONS

Search Report for IT 202100003860 dated Nov. 2, 2021.

*Primary Examiner* — A B Salam Alkassim, Jr.
*Assistant Examiner* — Anh N Ho
(74) *Attorney, Agent, or Firm* — B. Aaron Schulman, Esq.; Stites & Harbison, PLLC

(57) ABSTRACT

A millimeter-wave antenna for 5G applications is provided which includes an upper outer layer with a plurality of first radiating elements arranged spaced apart from each other on a first dielectric sublayer, a first inner layer arranged below the upper outer layer and having a plurality of through slots for conveying, towards the first radiating elements feeding signals to be radiated, a second inner layer arranged below and adjacent to the first inner layer having a dielectric sublayer on which there is arranged a plurality of conductive lines for conducting the feeding signals to be radiated towards the first radiating elements, a further inner layer arranged below and adjacent to the second inner layer, and a plurality of first through openings each formed on the further inner layer in a position corresponding to the position of an associated through slot.

11 Claims, 8 Drawing Sheets

(51) Int. Cl.

*H01Q 13/10* (2006.01)
*H01Q 21/00* (2006.01)
*H01Q 1/24* (2006.01)

(56) References Cited

U.S. PATENT DOCUMENTS

| | | | | |
|---|---|---|---|---|
| 6,037,903 | A * | 3/2000 | Lange | H01Q 1/38<br>343/872 |
| 6,184,832 | B1 * | 2/2001 | Geyh | H01Q 21/065<br>343/700 MS |
| 6,239,762 | B1 * | 5/2001 | Lier | H01Q 21/24<br>343/846 |
| 6,624,787 | B2 | 9/2003 | Puzella et al. | |
| 7,123,193 | B2 * | 10/2006 | Velve | H01Q 21/24<br>343/700 MS |
| 7,132,990 | B2 * | 11/2006 | Stenger | H01Q 21/0087<br>343/754 |
| 11,264,702 | B1 * | 3/2022 | Chieh | H01Q 21/065 |
| 2003/0067410 | A1 * | 4/2003 | Puzella | H01Q 21/065<br>343/700 MS |
| 2015/0015453 | A1 * | 1/2015 | Puzella | H05K 1/0206<br>333/1.1 |
| 2018/0337456 | A1 * | 11/2018 | Liu | H01Q 1/48 |
| 2019/0020110 | A1 * | 1/2019 | Paulotto | H01Q 5/20 |
| 2020/0067183 | A1 * | 2/2020 | Chang | H01Q 21/24 |
| 2020/0161767 | A1 * | 5/2020 | Hara | H01Q 9/0457 |

* cited by examiner

MILLIMETER-WAVE ANTENNA FOR 5G APPLICATIONS AND VEHICLE COMPRISING SUCH ANTENNA

The present invention relates to a millimeter-wave antenna for 5G applications, and to a vehicle comprising such antenna.

The antenna according to the present invention is especially suitable for use in vehicles, such as for example automobiles, buses, trains, commercial vehicles et cetera, and will be described in the following with reference to such applications, however without thereby intending in any way to limit its use in other possible fields of application.

As is well known, over the last decades wireless data traffic has progressively assumed increasing proportions, thus requiring the implementation of ever faster and more reliable communication systems.

To this end, implementation is currently ongoing of the most recent so-called 5G communication system, to which millimeter-wave (mmW) frequency bands have been allocated.

Clearly, for this system as well, one of the fundamental components for the proper transceiving of data is represented by antennas, which include, among their essential components, the radiating elements dedicated to the transceiving of signals, and the control electronics designed to control and appropriately drive the operation of the radiating elements themselves.

The assembly among these components leads to some problems relating for example to the effective quality of the transmitted signals. In fact, the presence in the structure of the antenna of conductive elements that act as ground planes could create within the antenna mirror effects with reflected signals that overlap, in a phase-shifted manner, with the signals to be transmitted and could negatively affect the overall quality of the transmissions.

In order to obviate these drawbacks, one solution foresees to increase the distance between the radiating elements and the ground planes present, for example by increasing the layers of dielectric material interposed between them.

In this case, however, the cost and dimensions of the antennas are negatively affected, rendering their use more difficult, for example in vehicles, such as automobiles, wherein the spaces available for antennas are limited and moreover it is usually necessary to contemporaneously make use of multiple antennas located in different positions due to the extensive presence of metal parts that act as a shield for the antennas themselves.

The main object of the present invention is to provide a millimeter-wave antenna for 5G applications that makes it possible in particular to solve or at least reduce the problems relating to unwanted reflections of the signals to be transmitted, while requiring a construction structure that is compact and easy to implement at relatively low costs.

This main object, as well as any other object which will emerge more clearly from the description that follows, are achieved by a millimeter-wave antenna for 5G applications which comprises a multilayer structure including at least:

- an upper outer layer comprising at least a plurality of first radiating elements arranged spaced apart from each other on a first dielectric sublayer;
- a first inner layer arranged below the upper outer layer and comprising a plurality of through slots suitable for conveying, towards said plurality of first radiating elements, feeding signals to be radiated;
- a second inner layer arranged below and adjacent to said first inner layer, said second inner layer comprising at least one dielectric sublayer on which there is arranged a plurality of conductive lines suitable for conducting the feeding signals to be radiated towards the plurality of first radiating elements;
- a further layer arranged below and adjacent to said second inner layer and comprising a plurality of first through openings, each of said first through openings being formed on the further layer in a position corresponding to the position of at least one associated through slot of said plurality of through slots.

This main object, as well as any possible further object, are also achieved by a vehicle, typically a vehicle meant for transporting passengers, in particular an automobile, which comprises at least one millimeter-wave antenna for 5G applications, said at least one millimeter-wave antenna comprises a multilayer structure including at least:

- an upper outer layer comprising at least a plurality of first radiating elements arranged spaced apart from each other on a first dielectric sublayer;
- a first inner layer arranged below the upper outer layer and comprising a plurality of through slots suitable for conveying, towards said plurality of first radiating elements, feeding signals to be radiated;
- a second inner layer arranged below and adjacent to said first inner layer, said second inner layer comprising at least one dielectric sublayer on which there is arranged a plurality of conductive lines suitable for conducting the feeding signals to be radiated towards the plurality of first radiating elements;
- a further layer arranged below and adjacent to said second inner layer and comprising a plurality of first through openings, each of said first through openings being formed on the further layer in a position corresponding to the position of at least one associated through slot of said plurality of through slots.

Particular embodiments constitute the subject matter of the dependent claims, the content of which is to be understood as an integral part of this patent description.

Further characteristic features and advantages of the invention will become apparent from the detailed description that follows, set forth purely by way of non-limiting example, with reference to the attached drawings, in which:

FIG. 1 schematically illustrates a possible embodiment of a millimeter-wave antenna according to the present invention;

Figure 1:
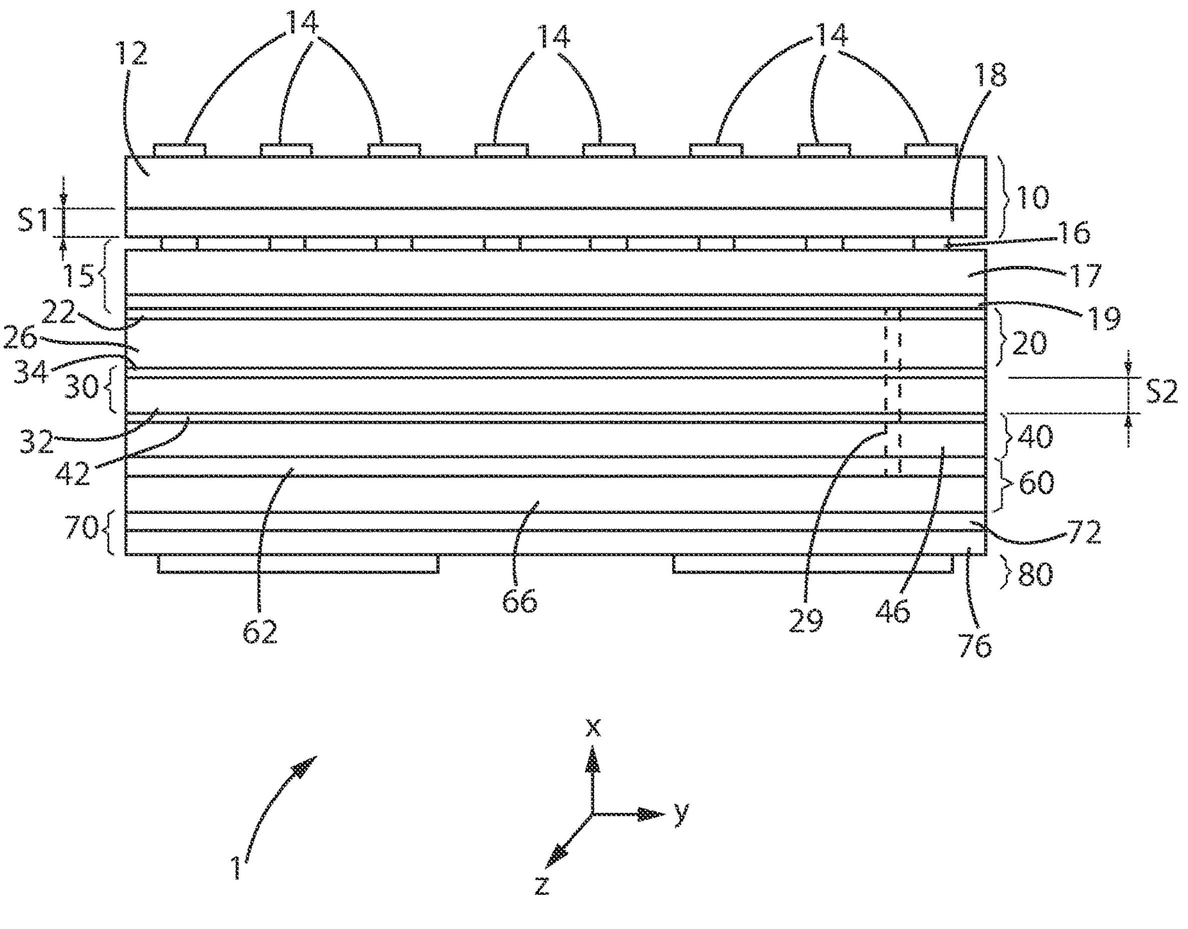

FIGS. 4 to 8 schematically illustrate portions of some layers that are usable in the antenna shown in FIG. 1.

It should be noted that in the detailed description that follows, components that are identical or similar, from a structural and/or functional standpoint, may have the same or different reference numerals, regardless of whether they are shown in different embodiments of the present invention or in distinct parts.

It should also be noted that, in order to clearly and concisely describe the present invention, the drawings may not necessarily be to scale and some characteristic features of the description may be shown in a somewhat schematic form.

Furthermore, where the term "adapted", or "organized", or "configured", or "shaped", or "set", or any similar term may be used in the present document making reference to any component as a whole, or to any part of a component or a combination of components, it is to be understood that it refers to and correspondingly includes the structure and/or configuration and/or form and shape and/or positioning.

In particular, when these terms refer to electronic hardware or software means, they are to be understood as including chips, circuits or parts of electronic circuits, or similar components.

In addition, where the term "substantial" or "substantially" is used herein, it is to be understood as including an actual variation of plus or minus 5% with respect to that which is indicated as the reference value, axis or position; and where the terms "transverse" or "transversely" are used herein, they are to be understood as including a direction that is not parallel to the reference part or parts or direction(s)/ axes to which they refer, and perpendicularity is to be considered as a specific case of transverse direction.

Finally, in the description and in the claims that follow, the ordinal numerals first, second, et cetera, will be used for purposes of illustrative clarity and in no way should they be construed as limiting for any reason whatsoever; in particular, the indication for example, of a "first layer", or of a first "first sublayer, . . . ", does not necessarily imply the presence of or the stringent requirement, in all the embodiments, of a further "second layer" or "second sublayer" or vice versa, unless this presence is clearly evident for the proper operation of the described embodiments, nor that the order is to be identical to the sequence described with reference to the illustrated exemplary embodiments.

FIG. 1 schematically illustrates one possible embodiment of a millimeter-wave antenna according to the invention, indicated as a whole by the reference numeral 1.

In particular, the antenna 1 according to the invention comprises a multilayer structure stacked vertically along the reference direction indicated in FIG. 1 by the reference axis X, said multilayer structure including at least:

- an upper outer layer 10;
- a first inner layer 20 arranged below the upper outer layer 10;
- a second inner layer 30 arranged below and adjacent to the first inner layer 20; and
- a further inner layer 40 arranged below and adjacent to the second inner layer 30.

Figure 2:
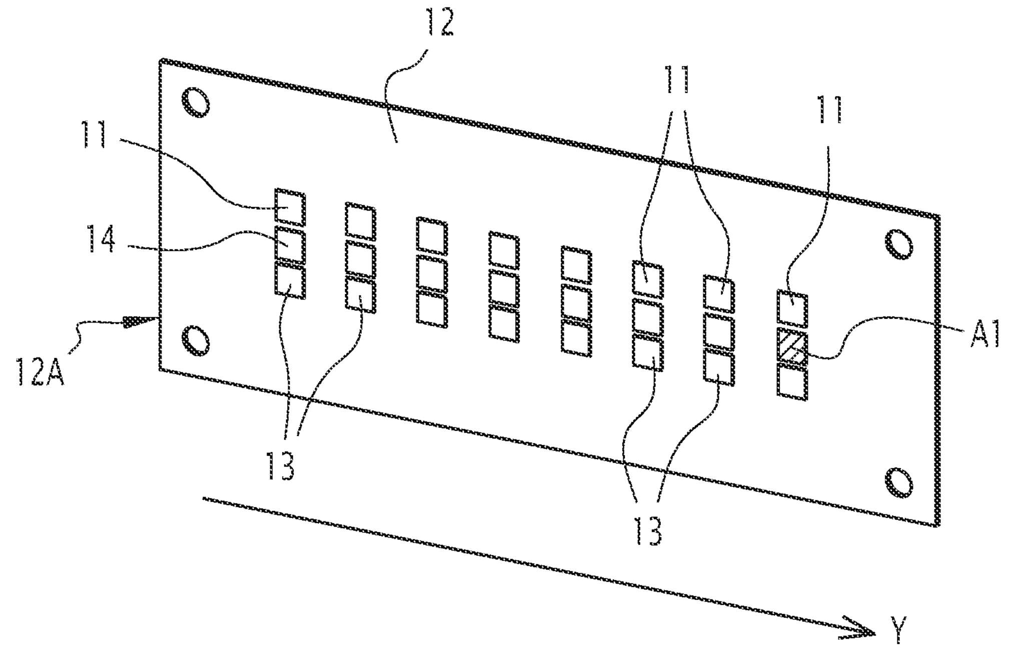
FIG. 2 is a view that schematically illustrates a portion of the upper outer layer of the antenna shown in FIG. 1 provided with radiating elements.

In particular, in the possible embodiment illustrated in FIGS. 1 and 2, the upper outer layer 10 comprises at least a first dielectric sublayer 12, for example made from ROGERS RO4350B material, and a plurality of first radiating elements 14 suitable for being fed with and radiating the signals to be transmitted.

The first radiating elements 14 are made of electrically conductive material, for example copper, and are arranged spaced apart from each other on the first dielectric sublayer 12 substantially aligned in sequence along a reference horizontal axis Y that is perpendicular to the axis X.

The first radiating elements 14 are preferably substantially identical to each other and each have a radiating area or surface "A1" measured in a plane transverse to the axis X, that is to say in the plane of the layer itself. For simplicity of illustration, this radiating area is clearly indicated in FIG. 2 with oblique lines only for one radiating element 14.

In the illustrated exemplary embodiment, the first radiating elements 14 are of the type more precisely referred to as "patches", according to the nationally and internationally used term, with each having a substantially regular geometrical configuration, for example square or rectangular or circular.

In the embodiment illustrated in FIG. 1, the upper outer layer 10 has a second sublayer 18, also referred to hereinafter as the first bonding sublayer 18, for example made from ROGERS RO4450 material, which is capable of enabling bonding of the upper outer layer 10 in its entirety with the layer of the plurality of layers immediately below it. This first bonding sublayer 18 has a first thickness S1.

According to one possible embodiment illustrated in FIG. 1, and for the purposes which will be described in more detail below, the multilayer structure of the antenna 1 usefully comprises one additional inner layer 15, illustrated in FIG. 3, which is bonded to the first bonding sublayer 18, and is therefore interposed between the upper outer layer 10 and the first inner layer 20.

Alternatively, in one possible embodiment, the first inner layer 20 may be arranged immediately below and directly bonded in its upper part to the first bonding sublayer 18; in this case the additional inner layer 15 is not used.

Figure 4:
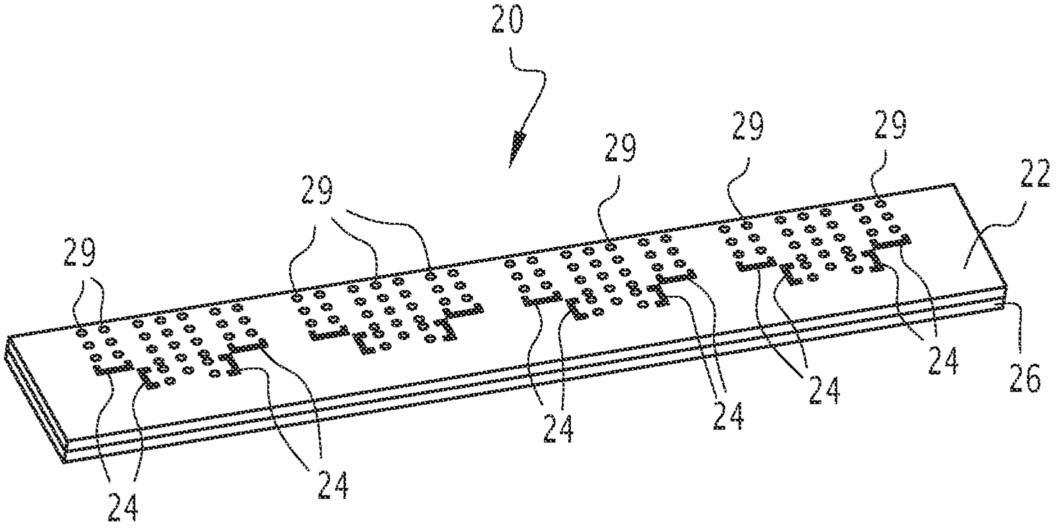

As illustrated in FIGS. 1 and 4, the first inner layer 20 comprises at least an own first sublayer of conductive material 22, constituted for example of a copper foil, which is arranged on an own second sublayer of dielectric material 26. This second sublayer of dielectric material 26 may be prepared in a manner such as to have adhesive properties and enable bonding with the layer of the plurality of layers immediately there-below, that is to say in the illustrated exemplary embodiment with the second inner layer 30, or it may be combined with some adhesive material added so as to enable it to adhere to the subsequent layer.

Conveniently, the first inner layer 20 comprises a plurality of through slots 24, having for example a U or C shaped form, which pass through the first sublayer of conductive material 22 and the second sublayer of dielectric material 26 and are suitable for conveying, towards at least the plurality of first radiating elements 14, the feeding signals to be radiated originating from the lower layers of the antenna 1 which will be described hereinafter.

In particular, in the antenna 1 according to the invention for each first radiating element 14 there is provided at least one corresponding slot 24 operatively associated thereto; with reference to the substantially vertical direction indicated in FIG. 1 by the axis X, each through slot 24 is realized on the first inner layer 20 in an underlying position corresponding to the position of the associated first radiating element 14 on the upper outer layer 10.

Preferably, with reference to the vertical direction represented by the axis X, each slot 24 extends over the upper horizontal surface of the first inner layer 20 in a manner such that at least one end portion thereof is outside a virtual area obtained by projecting vertically (along the direction of the axis X) onto the first inner layer 20 itself the radiating surface "A1" of the associated first radiating element or alternatively by projecting, again vertically, each slot 24 onto the first inner layer 20.

In one possible embodiment, as illustrated in the example of FIG. 4, for each first radiating element 14 there is provided an associated pair of through slots 24, the two through slots 24 of each pair being formed on the first inner layer 20 in an underlying position corresponding to the position of the associated first radiating element 14 on the upper outer layer 10.

In the illustrated exemplary embodiment, the two slots of each pair of through slots 24, having for example a C or U shaped form, are arranged substantially perpendicular to each other.

Also in this case, with reference to the vertical direction represented by the axis X, each slot 24 extends over the upper horizontal surface of the first inner layer 20 in a manner such that at least one end portion thereof extends outside a virtual area obtained by projecting vertically onto the first inner layer 20 itself the radiating surface “A1” of the associated first radiating element 14 (or alternatively by projecting, again vertically, each slot 24 onto the first inner layer 20).

Furthermore, at least on the first inner layer 20 there is defined a plurality of metallized holes 29 which pass through the sublayers 22 and 26.

Figure 5:
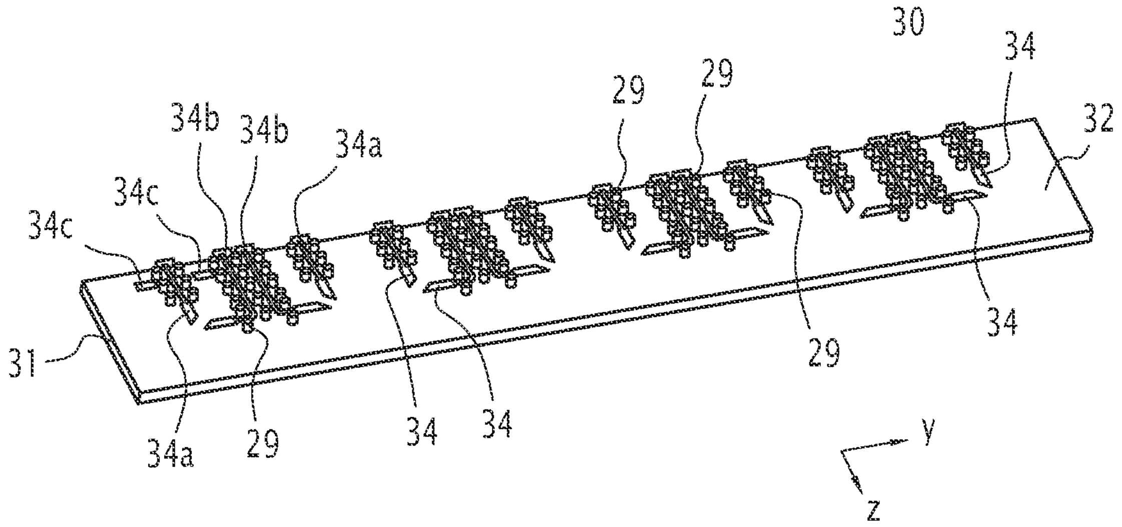

As illustrated in FIGS. 1 and 5, the second inner layer 30, which is attached above the sublayer 26, comprises at least an own first dielectric sublayer 32 (also referred to as third dielectric sublayer 32 to better distinguish it from the dielectric layers described previously) on which there is arranged a plurality of conductive lines 34, constituted for example of copper strips, that are suitable for conducting the feeding signals to be radiated at least towards the plurality of first radiating elements 14.

In particular, at least one corresponding conductive line 34 is associated with each radiating element.

In one possible embodiment, the third dielectric sublayer 32 acts as a bonding layer and therefore has adhesive properties or includes adhesive material in order to enable bonding with the layer of the plurality of layers immediately below the inner layer 30, that is to say in the exemplary embodiment illustrated with the further inner layer 40.

In particular, the third dielectric sublayer 32, which may be made of or comprise for example ROGER RO4450 material, has an overall thickness S2 equal to or greater than the thickness S1 of the first bonding layer 18; in this manner, an improvement in the adapting or “matching” of the signals is advantageously obtained.

According to the embodiment illustrated in FIG. 5, the plurality of conductive lines 34 comprises for each first radiating element 14 a corresponding pair of conductive lines 34 associated therewith, and having for example shapes that differ from each other.

More in detail, according to this embodiment, each pair of conductive lines 34 comprises a first conductive line 34*a*, formed for example by a copper strip having a substantially rectilinear development, that is capable of transmitting to the corresponding first radiating element 14 the feeding signals to be radiated in a first direction of polarisation, and a second conductive line 34*b*, for example formed by an L-shaped copper strip, that is capable of transmitting to the said corresponding first radiating element 14, the feeding signals to be radiated in a second direction of polarization which is different from the first direction. These directions may be, for example, a first direction along the reference axis Z and a second direction along the reference axis Y, illustrated in FIG. 5.

Furthermore, the second inner layer 30 as well comprises metallized holes 29 that pass through its sublayers 34 and 32 and are each vertically aligned with a corresponding metallized through hole 29 created on the first inner layer 20; in FIG. 5, for illustrative purposes, the metallized through holes 29 have been shown so that to clearly evidence the shape of through channels or cylinders.

Conveniently, each conducting line 34 extends over the plane of the sublayer 32 with the metallized holes 29 being arranged alongside on both edges and replicating the path of an associated conducting line 34.

Furthermore, in one possible embodiment illustrated in FIG. 5, the conductive lines 34*a* and 34*b* of adjacent pairs of lines 34 are arranged in a mutually inverted sequence relative to each other. Furthermore, each line may be flipped to mirror-image or by 180° in the plane of the layer 30 itself, relative to the analogous preceding line.

More in detail, with reference to a direction of displacement along the axis Y, starting from the outer transverse edge 31 in a position corresponding to the positioning on the upper outer layer 10 of the first radiating element 14 arranged closest to the left edge 12A, on the inner layer 30 there is arranged: firstly, the first strip 34*a* that is capable of transmitting to the associated first radiating element 14 the feeding signals to be radiated in the first direction of polarisation; and then successively, the second conductive line 34*b* that is capable of transmitting to the same first radiating element 14 the feeding signals to be radiated in the second direction of polarization. Continuing along the direction Y, at the position of the subsequent first radiating element 14 on the upper outer layer 10, on the layer 30 there is arranged the second pair of conductive lines 34*a* and 34*b*, with the sequence being inverted and each line 34*a* and 34*b* being flipped by 180° relative to the analogous line of the preceding pair. In practice, proceeding along the axis Y, there is firstly the second conductive strip 34*b*, that is capable of transmitting to this subsequent radiating element 14 the feeding signals to be radiated in the second direction of polarisation, which is arranged with the L-shaped form flipped by 180° in the plane of the layer 30 relative to the analogous second line 34*b* of the preceding pair of lines; then, there is arranged the first line 34*a* (again flipped to mirror-image or by 180° relative to the analogous first line 34*a* of the preceding pair) that is capable of transmitting to the same subsequent radiating element 14 the feeding signals to be radiated in the first direction of polarization. The inversion of the positioning order between the first strip 34*a* and the second strip 34*b* with any relevant flipping relative to the analogous lines of the preceding pair, is regularly repeated at each subsequent radiating element 14 relative to the preceding one.

Furthermore, in one possible embodiment, one or more of the conductive lines 34, preferably all of them, comprise each at least one section of line derived in parallel along the corresponding conductive line 34, preferably arranged to be coincident with the transition zone which in the exemplary embodiment happens to be close to the outer edge of the layer, but which in general could be found within a wider layer, and in particular to be coincident with the transition of a radiofrequency signal, suitable for shifting the signal itself onto a different layer of the antenna, without introducing significant losses. This derived section makes it possible to artificially introduce alterations that serve to further enhance the so-called “matching” of the signal transition zones.

This derived section of line may be constituted, for example, by a further portion of strip, and is illustrated in FIG. 5 by the reference numeral 34*c* only for one pair of conductive lines 34 for the sake of simplicity of description.

As illustrated in more detail in FIG. 6, the further inner layer 40, which is arranged below and is adjacent to the second inner layer 30, comprises at least an own first sublayer of conductive material 42 (hereinafter also referred to as second conductive sublayer 42 so as to distinguish it from the preceding sublayer 22), constituted for example of a copper foil, which is arranged on an own second dielectric sublayer 46 (hereinafter also referred to as fourth dielectric sublayer 46 so as to distinguish it from the previously described dielectric layers).

The fourth dielectric sublayer 46 as well may be made directly from a material having adhesive properties or be associated with added adhesive material.

In particular, on the further inner layer 40 there is defined a plurality of first through openings 44 passing through its sublayers 42 and 46.

More in detail, with reference to the substantially vertical direction indicated in FIG. 1 by the axis X, each of said first through openings 44 is formed on the further inner layer 40, and in particular on the sublayer of conductive material 42, in a position corresponding to the position of at least one associated through slot 24 of the plurality of through slots 24 defined on the first sublayer of conductive material 22 of the first inner layer 20.

Conveniently, in one possible embodiment, with reference to the operation of the antenna 1 at the nominal operating frequency, each first through opening 44 delimits an area of through-passage "B", measured transversely relative to the reference axis X, which is substantially equal to at least $\lambda^2/4$, that is to say at least a quarter of the square of the wavelength A measured in the dielectric material formed by the assembly of the third dielectric sublayer 32 immediately above the sublayer of conductive material 42 and the fourth dielectric sublayer 46 immediately below the sublayer of conductive material 42.

Figure 6:
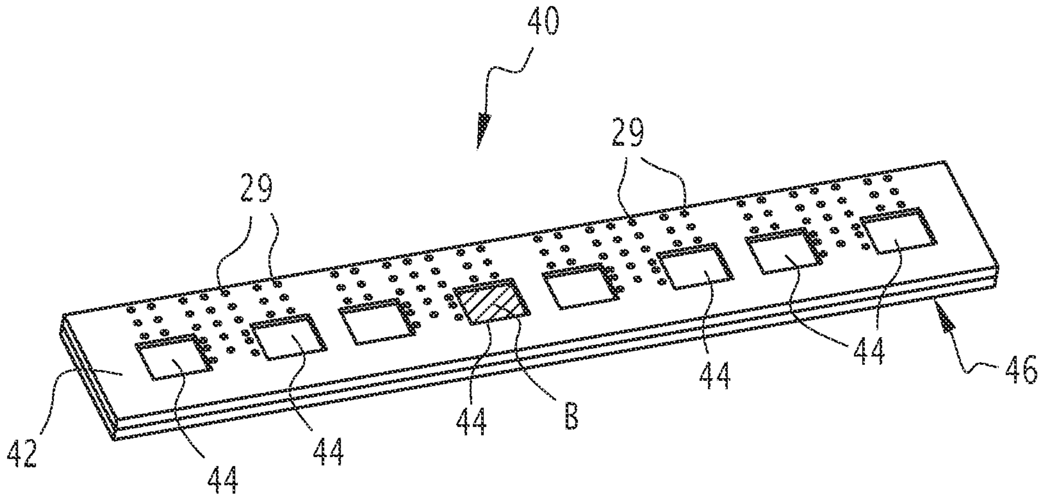

For the sake of simplicity of illustration, in FIG. 6 the area of through-passage "B" has been represented with oblique lines only for one opening 44.

In this manner, the presence of through openings 44, formed in particular on the sublayer of conductive material 42 which acts as a ground plane, substantially prevents the presence of reflection effects which would affect the quality of the signals transmitted, while providing for optimized overall dimensions and low costs as compared to different solutions aimed at tackling the same problem.

Furthermore, in the illustrated exemplary embodiment, the further layer 40 as well comprises metallized holes 29 which pass through at least its sublayer 42 and are arranged on parallel rows that are each aligned with a corresponding metallized through hole 29 created on the first inner layer 20 and on the second inner layer 30.

As previously mentioned, in one possible embodiment, the multilayer structure of the antenna 1 according to the invention usefully includes at least one additional inner layer, denoted in FIGS. 1 and 2 by the reference numeral 15 which is interposed between the upper outer layer 10 and the first inner layer 20, and is in particular bonded to the first bonding layer 18 there-above.

In the embodiment illustrated, the additional inner layer 15 comprises at least an own dielectric sublayer 17, hereinafter also referred to as a further dielectric sublayer 17, which also made for example from ROGERS RO4350B material, and a plurality of second radiating elements 16 arranged spaced apart from each other and suitable for being fed with and radiating the signals to be transmitted.

In the embodiment illustrated in FIG. 1, the additional inner layer 15 also comprises a further bonding sublayer 19, for example made from ROGERS RO4450 material, which is capable of enabling the bonding of the additional inner layer 15 to the underlying first inner layer 20.

The second radiating elements 16 are made of electrically conductive material, for example copper, and are arranged spaced apart from each other on the further dielectric sublayer 17, substantially aligned as well along the reference axis Y.

In particular, relative to the substantially vertical reference direction indicated by the axis X, each second radiating element 16 is placed below and substantially aligned, at a certain distance, with a corresponding first radiating element 14.

In this case, associated with each second radiating element 16 there is at least one conductive line 34, in particular at least the same conductive line 34 that is associated with the corresponding first radiating element 14 positioned there-above.

In the illustrated embodiment, each radiating element 16 is associated with a pair of conductive lines 34*a* and 34*b*; hence, each pair of conductive lines 34 is associated both with a corresponding second radiating element 16 as well as with the first radiating element 14 arranged above the said corresponding second radiating element 16.

The second radiating elements 16 are preferably substantially identical to each other and each extend over a radiating area or surface "A2" (for simplicity of illustration clearly indicated in FIG. 1 with oblique lines only for one radiating element 16) and in the illustrated embodiment they are also of the so-called "patch" type.

In the illustrated embodiment, each second radiating element 16 has a geometric configuration that is substantially regular, for example square, rectangular or circular. Conveniently, the second radiating elements 16 have each a respective radiation area A2, also measured on a plane transverse to the axis X, that is at most equal to and preferably less than the radiation area A1 of each of the first radiating elements 14.

In practice, the presence of the additional inner layer 15 provided with the second radiating elements 16 makes it possible to appropriately widen the range of operating frequencies of the antenna 1 according to the invention.

Preferably, with reference to the vertical direction represented by the axis X, also in this case each slot 24 extends over the upper horizontal surface of the first inner layer 20 in a manner such that at least one end portion thereof is outside a virtual area obtained by projecting vertically onto the additional inner layer 15 itself the radiating surface "A2" of the associated second radiating element 16 (or alternatively by projecting, again vertically, each slot 24 onto the additional inner layer 15.

Figure 3:
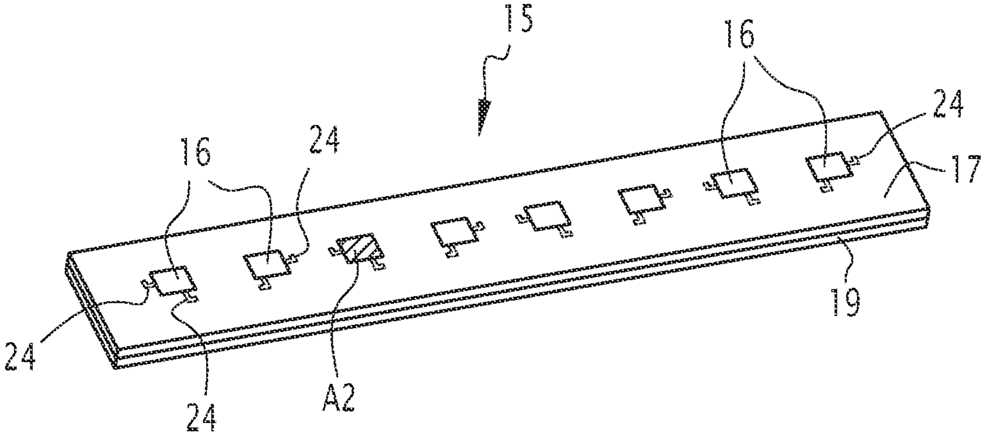
FIG. 3 is a view that schematically illustrates a portion of another layer provided with further radiating elements that is usable in the antenna shown in FIG. 1.

For illustrative purposes, this end portion of each slot 24 has been represented only in FIG. 3 by virtually projecting the slots 24 onto the additional inner layer 15. As previously described, an analogous configuration occurs in respect of at least one end portion of the slots 24 spilling out of the radiation areas A1 of the first radiating elements 14, even if this illustration has not been replicated in FIG. 2 for simplicity.

According to further possible embodiments, the multilayer structure of the antenna 1 may include one or more further layers.

In particular, in the exemplary embodiment of FIG. 1, there are for example illustrated a first additional layer 60 (hereinafter indicated as the third inner layer 60), a second additional layer 70 (hereinafter indicated as the fourth inner layer 70), and a third additional layer 80 (hereinafter indicated as the lower outer layer 80).

However, it has to be understood that, according to the applications, in the antenna 1 according to the invention, it is possible to use only one of such additional layers, only two, e.g. the first and second additional layers 60 and 70, or the first and third additional layers 60 and 80, or the second and third additional layers 70 and 80, or all of them as it will be described in the following according to the exemplary configuration depicted in FIG. 1.

The first additional layer or third inner layer 60 is arranged below and is adjacent to the further inner layer 40, for example bonded to the fourth dielectric sublayer 46.

Figure 7:
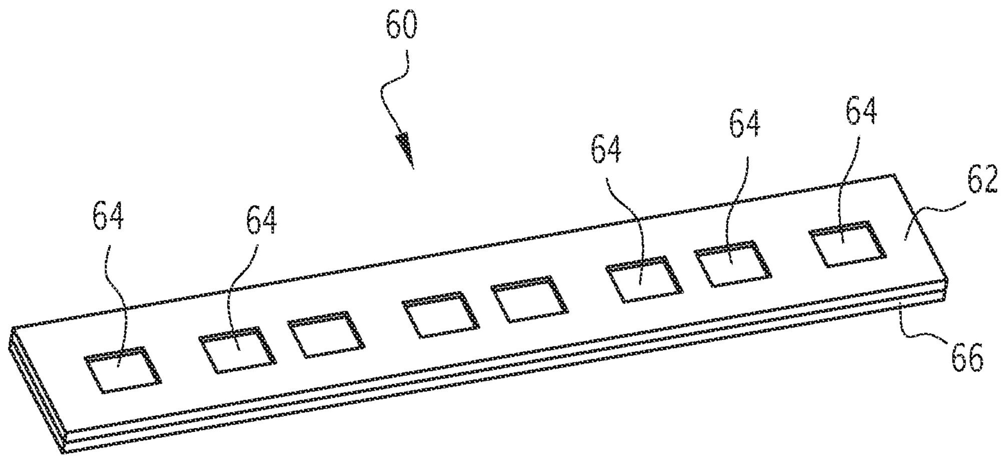

In one possible embodiment, and as illustrated in FIGS. 1 and 7, the third inner layer 60 comprises an own first sublayer of conductive material 62 (hereinafter also referred to as third conductive sublayer 62 so as to distinguish it from the preceding conductive sublayers 22 and 42) which is made for example from a copper foil in order to bring the feed voltages to the control chips of the antenna 1 and is arranged on an own second dielectric sublayer 66 (hereinafter also referred to as fifth dielectric sublayer 66 so as to distinguish it from the previously described dielectric layers) made from a material having adhesive properties or combined with some added adhesive material.

On the inner layer 60 there is defined a plurality of second through openings 64, which pass through the third conductive sublayer 62 and the fifth dielectric sublayer 66; these second through openings 64 in terms of number and shape thereof, are preferably substantially identical to the first through openings 44, with each of them being substantially aligned with a corresponding first through opening 44 relative to a substantially vertical reference direction defined by the axis X.

In one possible embodiment, also on the third inner layer and in particular only on the third conductive sublayer 62 there is defined a plurality of metallized through holes, not shown in FIG. 7, analogous to the through holes 29 indicated above, which are also arranged so as to be aligned each with a corresponding metallized through hole 29 formed on the first inner layer 20 and on the further inner layer 40.

In this case, the through holes also pass through the dielectric layer 46 and, seen along the vertical direction defined by the reference axis X, when the structure of the antenna 1 is assembled, form a plurality of through channels that start from the first sublayer of conductive material 22 and terminate in the third sublayer of conductive material 62, as schematically illustrated in dashed line in FIG. 1.

Alternatively, these channels formed by the vertically aligned through holes 29 may terminate at the second sublayer of conductive material 42.

In case there is used only the first additional layer 60, it will constitute the lower outer layer of the antenna 1, i.e. the layer located at the lowest position of the stack of layers used.

In the embodiment illustrated in FIG. 1, the second additional layer or fourth inner sublayer 70 is arranged below and is adjacent to the third inner layer 60, for example bonded to the fifth dielectric sublayer 66.

Figure 8:
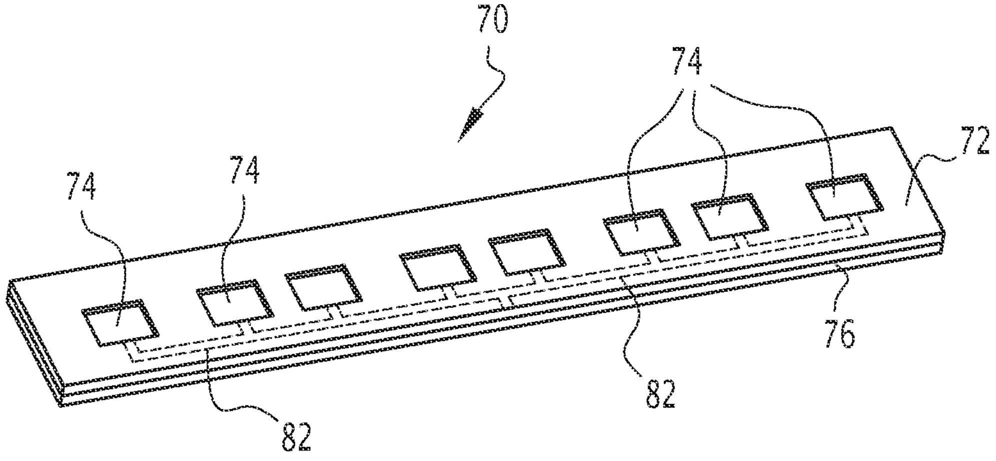

In one possible embodiment, and as illustrated in FIGS. 1 and 8, the fourth inner layer 70 comprises at least an own first sublayer of conducting material 72 (hereinafter also referred to as fourth conducting sublayer 72 so as to distinguish it from the preceding conducting sublayers 22, 42 and 62), which is made for example from a copper foil that acts as a ground plane, and is arranged on an own second dielectric sublayer 76 (hereinafter also referred to as sixth dielectric sublayer 76 so as to distinguish it from the preceding dielectric sublayers) having adhesive properties.

On the own first sublayer of conducting material 72 there is defined a plurality of third through openings 74; these third through openings 74, in terms of number and shape thereof, are preferably substantially identical to the first through openings 44, with each of them being substantially aligned with a corresponding first through opening 44 relative to a substantially vertical reference direction defined by the axis X.

In practice, once the various layers of the antenna have been assembled to each other, the first through openings 44, are substantially aligned, along the vertical development of the multilayer structure, with the second through openings 64, and/or with the third through openings 74.

In particular, in the embodiment of FIG. 1, the first through openings 44, the second through openings 64, and the third through openings 74 are substantially aligned with each other along the vertical development of the multilayer structure.

In case there is used only the second additional layer 70, i.e. the first additional layer 60 is not used, the second additional layer 70 will be arranged below and adjacent to the further inner layer 40 and it will constitute the lower outer layer of the antenna 1, i.e. the layer located at the lowest position of the stack of layers used. The second additional layer 70 will also constitute the lower outer layer of the antenna 1 if both only the first and second additional layers 60 and 70 are used.

According to the embodiment illustrated in FIG. 1, the third additional layer or lower outer layer 80 is arranged below the fourth inner layer 70 and comprises one or more connection tracks, schematically illustrated in FIG. 8 by dashed lines 82. These connection tracks are for example constituted of copper traces arranged coincident with the face of the dielectric sublayer 76 opposite to that on which the conducting sublayer 72 is arranged. The connection tracks 82 are capable of being connected with one or more chips (not illustrated) for control and/or conditioning, for example for phase shifting or amplification, of the feeding signals to be radiated for at least the plurality of first radiating elements 14 and, where used, also for the second radiating elements 16.

If the first and second additional layers 60 and 70 are not used, the third additional layer 80 will be arranged below and adjacent to the further inner layer 40, and if the second additional layer 70 is not used, the third additional layer 80 will be arranged below and adjacent to the first additional layer 60.

In any case, the third additional layer 80, when used, is preferably meant to constitute the lower outer layer of the antenna 1.

In one possible embodiment, the antenna 1 according to the invention further comprises at least one first series of parasitic radiating elements 11 and a second series of parasitic radiating elements 13 arranged on at least the said upper outer layer 10, in particular arranged on the first dielectric sublayer 12. As illustrated in FIG. 2, the parasitic radiating elements 11 and 13 are arranged so as to be aligned along two rows that are parallel to each other with the plurality of first radiating elements 14 interposed between them.

The series of parasitic radiating elements 11 and 13 serve to ameliorate the conformation of the irradiation beams of the transmitted signals.

Furthermore, two further series of parasitic radiating elements may also be associated with the second radiating elements 16, where used; in this case, in a manner analogous to that which has been described above, these further parasitic radiating elements may be arranged on the dielectric sublayer 17 along two parallel rows with the row of second radiating elements 16 interposed between them.

In practice it has been shown that the antenna 1 according to the invention allows achieving the intended object since the phenomena of unwanted reflections of the signals that overlap the signals to be transmitted in an undesirable manner are significantly reduced if not completely eliminated, with a structure having reduced overall dimensions. Further benefits, in addition to those mentioned previously, are obtained thanks to the slots 24 having at least one section that extends outside the radiating areas A1 and A2, so as to further optimize the matching; moreover, the arrangement of the conductive lines 34 in a mutually inverted sequence promotes the various connections without having to intertwine/interlace the connection tracks onto the chips. The presence of the metallised holes 29 arranged to be aligned along the two sides of each conductive line 34 and following the path thereof makes it possible to better confine the electromagnetic field within the zones in which the conductive lines 34 themselves are present.

With further advantage, the antenna 1 according to the invention can be used in principle in any type of vehicle and can be easily installed both on new vehicles and, if desired, on vehicles already in circulation. Therefore, a further object of the present invention relates to a vehicle characterized in that it comprises at least one antenna 1 according to what described above, and more particularly defined in the appended claims. Clearly, this vehicle may be of any type that is able to exploit the transceiving of data in the 5G band, such as automobiles, buses, trains, trucks, commercial vehicles, etc.

Naturally, the principle of the invention remaining the same, the embodiments and the particular details of production or implementation may be widely varied as compared to what described and illustrated purely by way of preferred but non-limiting examples, without thereby departing from the scope of protection of the present invention as defined in particular by the attached claims. The shape-form and/or positioning of the described components or of parts thereof may be appropriately modified provided that the same is done in a manner compatible with the scope and the functionalities for which the said components have been conceived within the frame of the present invention. For example, the first radiating elements 14 and/or when used the second radiating elements 16 may assume a different configuration as compared to the one described, or the number of radiating elements used may be different as compared to the eight elements 14 and 16 per layer represented in the illustrated example; the antenna 1 may comprise further components, such as for example a containment casing, not illustrated in figures, which is made for example of plastic material and inside which the described multilayer structure is housed; the conductive lines 34 may be configured differently and/or follow paths that differ from that which has been described, for example a curvilinear path, et cetera.

The invention claimed is:

1. A millimeter-wave antenna for 5G applications, comprising a multilayer structure comprising:

- an upper outer layer comprising at least a plurality of first radiating elements arranged spaced apart from each other on a first dielectric sublayer;
- a first inner layer arranged below the upper outer layer and comprising a plurality of through slots suitable for conveying, towards said plurality of first radiating elements, feeding signals to be radiated;
- a second inner layer arranged below and adjacent to said first inner layer, said second inner layer comprising at least one dielectric sublayer on which there is arranged a plurality of conductive lines suitable for conducting the feeding signals to be radiated towards the plurality of first radiating elements;
- a further inner layer arranged below and adjacent to said second inner layer and comprising a plurality of first through openings, each of said first through openings being formed on the further inner layer in a position corresponding to the position of at least one associated through slot of said plurality of through slots; and
- a first additional layer arranged below and adjacent to said further inner layer, said first additional layer comprising a plurality of second through openings substantially aligned each to a corresponding first through opening with respect to a substantially vertical reference direction wherein at least said first inner layer comprises a plurality of metallized through holes.

2. The millimeter-wave antenna according to claim 1, wherein said multilayer structure further comprises at least one additional inner layer which is interposed between said upper outer layer and said first inner layer, said at least one additional inner layer comprising at least a plurality of second radiating elements arranged spaced apart on a further dielectric sublayer.

3. The millimeter-wave antenna according to claim 2, wherein the second radiating elements have each a radiation surface equal to or less than a radiation surface of the first radiating elements.

4. The millimeter-wave antenna according to claim 3, wherein each through slot extends over an upper surface of the first inner layer with an end portion thereof extending out of a virtual area obtained by projecting on the first inner layer itself the radiation surface of a corresponding first radiating element or second radiating element.

5. The millimeter-wave antenna according to claim 1, wherein it further comprises a second additional layer arranged below and adjacent to said first additional layer, said second additional layer comprising a plurality of third through openings substantially aligned each at least to a corresponding first and second through openings with respect to said substantially vertical reference direction.

6. The millimeter-wave antenna according to claim 1, wherein it further comprises a lower outer layer on which there are provided tracks for connection with one or more chips for conditioning the feeding signals to be radiated for at least said first plurality of radiating elements.

7. The millimeter-wave antenna according to claim 1, wherein said upper outer layer further includes a first gluing sublayer adapted to allow gluing of the upper outer layer with a layer of the plurality of layers immediately adjacent thereto, and in which said second inner layer comprises a second dielectric sublayer having a thickness at least equal to the thickness of the first gluing sublayer.

8. The millimeter-wave antenna according to claim 1, wherein said plurality of conductive lines comprises for each first radiating element an associated pair of conductive lines of which a first conductive line is adapted to transmit to the corresponding first radiating element feeding signals to be radiated in a first direction of polarization, and a second conductive line is adapted to transmit to said corresponding first radiating element feeding signals to be radiated in a second polarization direction.

9. The millimeter-wave antenna according to claim 8, wherein the first conductive line and the second conductive line of each pair of conductive lines are arranged along the second inner layer according to an inverted sequence with respect to the corresponding first and second conductive lines of the previous and/or following pair of conductive lines.

10. The millimeter-wave antenna according to claim 1, comprising at least a first series of parasitic radiating elements and a second series of parasitic radiating elements arranged on at least said upper outer layer along two rows parallel to each other with the first plurality of radiating elements interposed between them.

11. A vehicle comprising at least one millimeter-wave antenna according to claim 1.

* * * * *